United States Patent [19]
Murphy et al.

[11] Patent Number: 5,141,400
[45] Date of Patent: Aug. 25, 1992

[54] WIDE CHORD FAN BLADE

[75] Inventors: Guy C. Murphy, Fairfield; Barrett J. Fuhrmann, Cincinnati, both of Ohio

[73] Assignee: General Electric Company, Cincinnati, Ohio

[21] Appl. No.: 645,774

[22] Filed: Jan. 25, 1991

[51] Int. Cl.⁵ .......................... B63H 1/20; B63H 1/26
[52] U.S. Cl. .......................... 416/204 A; 416/219 R; 416/229 R; 416/241 A; 416/229 A; 416/248
[58] Field of Search ......... 416/204 R, 204 A, 219 R, 416/229 R, 229 A, 241 R, 223 R, 224, 248, 241 A; 29/889.7, 889.71, 527.1, 527.4; 156/263, 267, 309.6, 307.3

[56] References Cited

U.S. PATENT DOCUMENTS

| | | | |
|---|---|---|---|
| 3,600,103 | 8/1971 | Gray et al. | 416/224 |
| 3,637,325 | 1/1972 | Morley | 416/230 |
| 3,649,425 | 3/1972 | Alexander | 416/229 A |
| 3,679,324 | 7/1972 | Stargardter | 416/229 |
| 3,699,623 | 10/1972 | Kreider | 29/156.8 |
| 4,029,838 | 6/1977 | Chamis et al. | 428/301 |
| 4,416,949 | 11/1983 | Gabellieri | 428/461 |
| 4,594,761 | 6/1986 | Murphy et al. | 29/156.8 |
| 5,018,271 | 5/1991 | Bailey et al. | 416/219 R |
| 5,049,036 | 9/1991 | Bailey et al. | 29/889.71 |

OTHER PUBLICATIONS

Wide Chord Fan Club; 23–29, May, 1990.

*Primary Examiner*—Thomas E. Denion
*Attorney, Agent, or Firm*—Carmen Santa Maria; Jerome C. Squillaro

[57] ABSTRACT

A laminated airfoil for use in a high bypass engine. The airfoil preferably has a large tip chord and is comprised of alternating layers of thin metallic foil and elastomeric layers. The exterior surfaces of the airfoil are comprised of a thin, metallic foil. The airfoil also has a metal sheath secured to the leading edge. High strength metal members extend through the dovetail root sections.

31 Claims, 2 Drawing Sheets

WIDE CHORD FAN BLADE

BACKGROUND OF THE INVENTION

Aircraft and aircraft engine design have always strived for reduced weight and greater efficiency. Other factors affecting aircraft and engine design involve cost and size, including the maintenance of the aircraft and the engines. With increased emphasis in these areas, future aircraft are growing in size, requiring either more thrust from the engines or additional engines. Reduced maintenance costs and initial costs can be achieved by enlarging the engines, increasing the thrust developed by the engines rather than by increasing the number of engines on a particular aircraft. However, as the engines grow larger, weight reduction becomes paramount as all the engine components are required to grow.

The next generation of commercial high thrust engines will have fan diameters ranging in size from 106 inches to 124 inches. The increased fan diameters will require longer blades. The longer blades will have wider chords for increased efficiency. The chord, which is the axial straight line dimension between the trailing edge and the leading edge of the airfoil, will grow with the increased blade size. Typical fan blades currently have tip chords of about 8 to 12 inches, while the wide chord fan blades for the larger engines will have tip chords in the range of about 20 to 28 inches. The wider chord blades offer the increased efficiency because they have greater stability margins and move the air more efficiently across the blade face due to their longer chords. The increased stability allows the blade to be manufactured without a mid-span shroud, which on current Titanium blades causes a decrease in blade efficiency. Increased blade efficiency is important in high bypass turbine engines because about 75% to 80% of the air bypasses the core engine combustor and is used to provide direct thrust.

The majority of the current fan blades in turbofan engines are solid titanium construction. Another fan blade construction utilizes titanium skin over a titanium honeycomb core. The manufacture of a solid titanium wide chord fan blade is prohibitive because of the initial cost of the materials and the ultimate weight of the blade upon completion. Thus, a solid fan blade for a larger engine would probably be more of a standard chorded blade with a mid span shroud.

A proposed solution to the problem of weight and cost for blades in larger engines is an all-composite wide chord fan blade. A large engine having all-composite wide chord fan blades has a projected weight savings of about 800 pounds over a large engine having standard chorded fan blades. The all-composite wide chord fan blade would also display a somewhat smaller, but nevertheless substantial, weight savings over titanium skin/titanium honeycomb blades.

The concept of all-composite blades has been attempted in the past. However, these blades have never been successfully implemented for several reasons. One early program developed erosion problems due to the poor erosion characteristics of the applied coating and to the lack of a metallic leading edge. The coating could not withstand rain droplet impacts without sustaining damage. Once the exterior coating was damaged, exposing the underlying laminated composite structure, the underlying composite structure was subjected to water damage from water ingestion and further impacts. These conditions caused severe delaminations in the blades and led to blade failure in relatively short times.

Another composite fan blade program was discontinued when the blades could not withstand small bird impacts (bird size of about 2.0–4.0 ounces) without delaminations under the leading edge. Although the blade could pass FAA requirements at the time, maintainability of the blades was projected to be a problem because these delaminations were "invisible", that is undetectable by visual inspection, and could propagate, causing potentially serious blade failures. It was believed that engines would always see impacts in this size range that would not be detected, so that the incident would go unnoticed, even though internal damage would have occurred to the blade.

Thus, there exists a need to provide a composite wide chord fan blade which can withstand typical impacts and operating conditions experienced by modern turbofan engines. The composite blade should offer stiffness and light weight, which are important as engine size and thrust continue to increase. However, the composite fan blade must be capable of equivalent or better performance at all operating conditions, including impact, of current metallic fan blades. Maintenance requirements should be comparable to current fan blades, and desirably should be reduced.

SUMMARY OF THE INVENTION

The present invention is a damped, energy absorbing, laminated airfoil. The airfoil, of wide chord configuration, has a tip portion, a dovetail root section, the dovetail root section having flank surfaces, a leading edge extending from the tip portion to the root section, and a trailing edge oppositely disposed to the leading edge and extending from the tip portion to the root section. The tip chord is larger than the conventional chords of current engines, being at least about 20 inches, and as large as 28 inches. The airfoil is comprised of alternating layers of thin metallic foil and elastomeric layers, thereby forming a laminated composite airfoil. The metallic foil forms the first and the last layers of the laminated structure, so that the outer surfaces of the airfoil are made from metallic foil. The alternating elastomeric layers provide the means of bonding the metallic foil layers, while providing inherent energy absorbing characteristics to the structure. At least one hole or aperture, and preferably a plurality of holes or apertures, are drilled into each dovetail flank surface extending at least partially through of the dovetail. A high strength metal member is then disposed through each of the dovetail root section apertures across the alternating layers and secured in place by adhesive bonding, thereby further securing the layers and providing additional strength. The adhesive bonding agent is preferably the same material used to secure the metallic foil layers together. A metal sheath is secured to the leading edge of the airfoil by adhesive bonding. In a preferred embodiment, the high strength metal member is a titanium-base pin, while the metallic foil in the airfoil is a titanium alloy foil or a stainless steel alloy foil having a uniform thickness of about 0.005 to about 0.015 inches. The leading edge sheath is a nickel alloy foil having a thickness of about 0.008 to about 0.012 inches on each of the edges and increasing to a thickness of about 0.040 to about 0.060 inches at the airfoil leading edge. Alternatively, the leading edge sheath is a stainless steel alloy or a titanium alloy foil having a uniform thickness of about 0.008 to about 0.015 inches.

The laminated airfoil is formed by preshaping the metallic foil. This may be conveniently done by superplastic forming, which is accomplished under stress at elevated temperature. The preshaped metallic foil having a thickness of from 0.005-0.015 inches is then trimmed to a predetermined size by conventional cutting or trimming techniques. The metallic foil and a heat flowable elastomeric film are then assembled into an assembly of alternating layers of each material and placed into a die. The die has a cavity which accepts the foil assembly and may also accept a metal leading edge sheath. The die cavity is further designed so that the final part produced will be a net shape or near net shape airfoil. The assembly, when placed into the die cavity, has a metallic foil first layer and last layer, so that the outer surfaces of final part are metal. After placing the assembly into the die, sufficient heat and pressure are applied to the ply assembly to cause the elastomeric film to flow by conventionally die pressing the assembly. This operation causes the elastomeric film to simultaneously bond to the alternating metal layers and to cure.

After removal of the cured airfoil from the die, subsequent finishing operations, such as drilling of dovetail root flank holes and insertion of high strength metal members coated with adhesive, final machining of the dovetail root section. final trimming, if necessary, and attachment of a leading edge sheaths, if not accomplished during die pressing, may be performed.

The present invention permits the use of alternating plies of materials to form airfoils, such as fan blades, and in particularly, wide chord fan blades, as well as compressor vanes. The advantages of airfoils formed in this manner is that they are lighter in weight than conventional airfoils, but retain strength and toughness required for such demanding applications. The reduced weight becomes more important in jet engine design as engines become larger and more powerful, requiring ever larger fans and vanes.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The subject matter which is regarded as the invention is particularly pointed out and distinctly claimed in the concluding portion of the specification. The invention itself. however, both as to its organization and its method of practice, together with further objects and advantages thereof, may best be understood by reference to the following description taken in conjunction with the accompanying drawings, in which:

DETAILED DESCRIPTION OF THE INVENTION

Pursuant to the present invention, a laminated airfoil having alternating layers of a metallic foil and lightweight film, with the metallic foil forming the first layer and the last layer so that the outer surfaces of the airfoil are metal is provided.

The present invention also encompasses methods for forming laminated airfoils from metallic foils and energy-absorbing elastomeric films or polymeric composite materials and combinations thereof. The energy-absorbing elastomeric films provide impact resistance and vibration damping to the composite blades, which is an important feature in preventing blade damage due to foreign object ingestion and fatigue.

Figure 1:
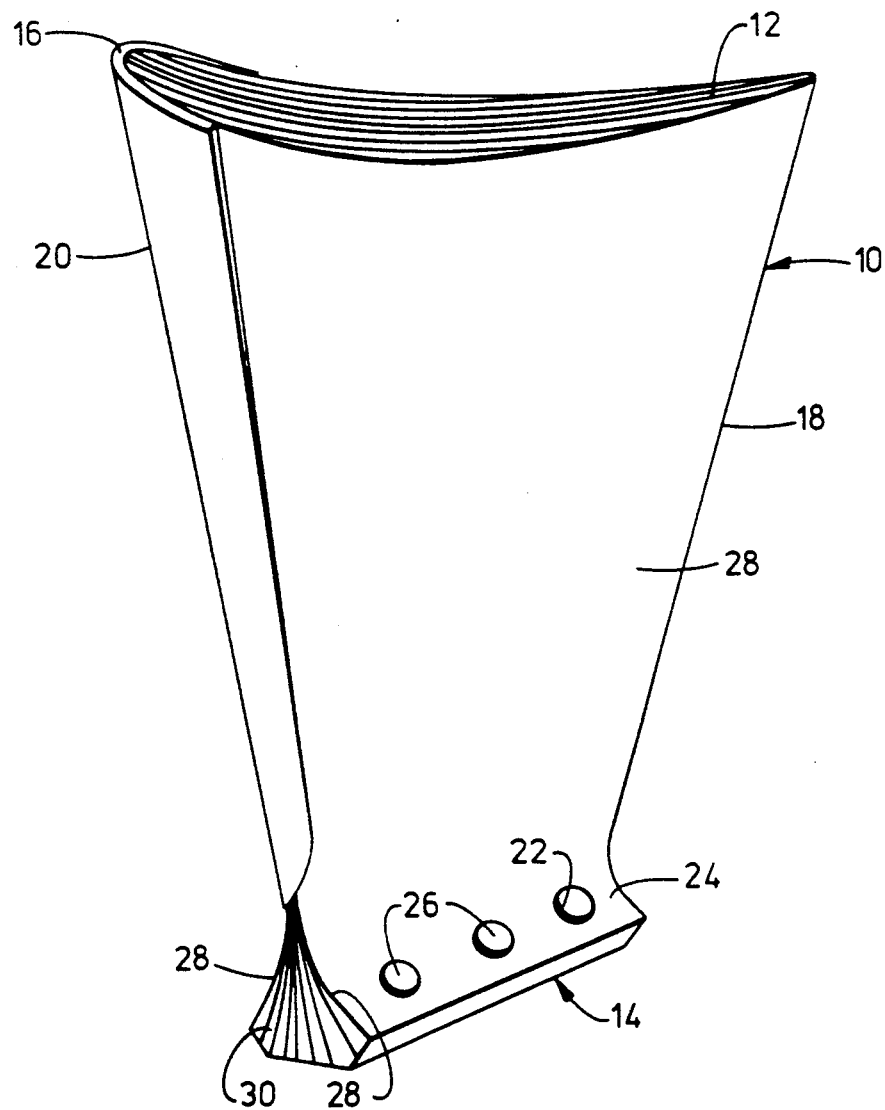
FIG. 1 is a perspective view of a fan blade airfoil having a dovetail root section and a metal sheath leading edge.

Referring now to FIG. 1, a perspective view of the laminated airfoil in the form of the wide chord fan blade 10 is shown. The fan blade has a tip portion 12, dovetail root section 14, a leading edge 16 extending from the tip portion 12 to the root section 14, a trailing edge 18 oppositely disposed to the leading edge 16 and extending from the tip portion 12 to the root section 14. The fan blade has a metal sheath 20 attached to the leading edge 16, apertures 22 extending through the flank surfaces 24 of the dovetail root section 14 and a high strength metal member 26 disposed through each dovetail root section aperture 22. The metal sheath 20 attached to the leading edge helps provide the fan blade with additional impact resistance, erosion resistance and improved resistance of the composite structure to delamination. The high strength metal member 26 improves delamination resistance and provides a wear resistant surface for the dovetail, which has some restricted movement in the dovetail slot of the rotor or fan disk. The metal member 26 also improves the compressive strength of the dovetail flank by becoming the primary load bearing portion of the composite fan blade. This feature of the metal member is significant since forces in the dovetail region are high during engine operation. The stresses in the fan blade due to rotation have components radially outward as well as axial. These stresses are sufficient to cause a fan blade without a stress-bearing metal member to flow outwardly and deform, resulting in potential blade separation from the disk or delamination of the composite. The fan blade is composed of alternating layers of metallic foil 28 and energy-absorbing elastomeric layers 30 forming the laminated composite fan blade 10 of FIG. 1. The metallic foil 28 forms the first and last layers of the alternating layers so that the outside surface of the fan blade 10 is metal.

The metallic foil may be any metallic foil suitable for use in aircraft engine applications. It is preferred that the metallic foil be selected from a group consisting of titanium alloys, nickel-base superalloys or stainless steels. It is preferred that the metallic foil be produced by superplastic forming. Superplastic forming is well known in the art. The superplastic forming method subjects certain metals which exhibit superplastic behavior to a low strain rate at high temperatures. Under these conditions, the metals can undergo unusually large amounts of plastic deformation, so that thin metallic films may be formed.

In a most preferred embodiment, the metal alloy of the airfoil is a titanium alloy foil produced by superplastic forming. A Ti-6Al-4V titanium alloy is selected because of its high strength-to weight ratio. This metal may advantageously be superplastically formed as is well-known to those skilled in the art at temperatures of about 1600° by using a pressurized inert gas to form the material to the desired shape and thickness against a mandrel using standard superplastic forming techniques. The final desired thickness is about 0.005–0.015 inches.

The energy-absorbing elastomeric layer 30 may be a modified adhesive film, an adhesive film having a thermoplastic carrier, or a polyurethane film coated with an adhesive layer A further distinguishing characteristic of the elastomeric layer, in addition to being energy-absorbing, is its ability to bond with the metallic foil.

When the elastomeric layer 30 is a modified adhesive film, preferred elastomers are epoxy resins having low flow characteristics such as FM-300I obtainable from American Cyanamid.

When the elastomeric layer 30 is an adhesive film having a thermoplastic layer carrier, preferred elastomers are HXT-440, or a bis-maleimide such as HXT-441 both obtainable from American Cyanamid.

Figure 2:
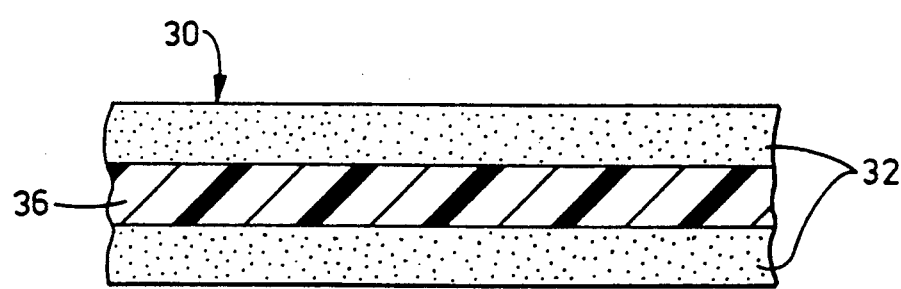
FIG. 2 is a cross section of an elastomeric layer in which a polyurethane film is coated on each side with an adhesive layer or alternatively, a combined elastomeric adhesive.

When the elastomeric layer is a polyurethane film coated with an adhesive layer, the total thickness of the polyurethane-adhesive coated film is approximately 0.003–0.015 inches. Referring now to FIG. 2, a cross section of a polyurethane film 36 coated on each side with an adhesive layer 32 forming elastomeric layer 30 is shown. A polyurethane film having adhesive layers and of the required thickness may be obtained from the 3-M Company.

The laminated airfoil 10 is formed by taking the metallic foil, and if necessary, pre-shaping the metallic foil into a predetermined shape. The metallic foil is then accurately trimmed to a predetermined size using standard trimming techniques. The metallic foil 28 and the heat-flowable energy-absorbing elastomeric layer 30 are then assembled into a die assembly in alternating layers. The die assembly is a conventional mold tool assembly in which the cavity of the die has the shape of the desired end product, in this case a laminated airfoil. The metallic foil 28 and the heat flowable elastomeric layer 30 are alternately layered into the die cavity, with the metallic foil forming the first layer and the last layer in the die cavity, so that the outer surfaces of the airfoil are metallic. Optionally, a leading edge sheath made from a metallic material, preferably a titanium alloy such as Ti-6Al-4V, may be assembled into the die assembly. This die assembly is then pressed while applying sufficient heat and pressure to flow the elastomeric layer thereby simultaneously bonding the elastomeric layer to the foil and the optional leading edge sheath and curing the ply assembly into a cured airfoil having net shape or near net shape.

In a preferred embodiment, titanium alloy foil, such as Ti-6Al-4V in accordance with AMS-4911 having a nominal composition in weight percent of about 5.5 to 6.75% Al, 3.5 to 4.5% V, 0.30% Fe Max., 0.20% O Max., 0.08% C Max., 0.05% N Max., 0.015% H Max., 0.005% Y Max. and the balance Ti and incidental impurities, with no more than 0.5% incidental impurities and an elastomeric layer 30 of polyurethane film 36 and coated on either side with about 0.0025 inches of an adhesive film 32 such as AF163-2 obtainable from 3-M Company are placed in a die assembly in the manner described above and heated at a temperature of about 230°–260° F. and to a pressure of about 50–150 psi for about two hours at temperature to form the near net shape airfoil.

The airfoil is then removed from the die assembly and trimmed if necessary. As depicted in FIG. 1, apertures 22 are drilled in the dovetail root flank surfaces 24 and adhesive-coated high strength metal members 26 are inserted into the apertures. These members provide additional strength to the airfoil. The additional strength is required in order for the dovetail to carry the compressive loads typically found in this portion of the blade. A metal sheath 20, preferably made from the same alloy as the metallic foil in the blade, in the preferred embodiment titanium alloy Ti-6Al-4V, is then applied to the leading edge 16 of the blade with an adhesive, preferably the same adhesive or material as used in the elastomeric layer. Optionally, the adhesive-coated metal sheath may be applied to the airfoil leading edge after assembly of the laminated airfoil preform assembly, but prior to insertion of the assembly into the die assembly., thus permitting the leading edge to be co-cured with the airfoil.

In a preferred embodiment of the present invention, the high strength metal members 26 disposed in each dovetail root section aperture 22 are titanium alloy pins, preferably Ti-6Al-4V. These pins are coated with an adhesive usually of the same type used in the elastomeric layer. These adhesives must be bondable to the metal of the pin and to the composite layers comprising the root section aperture 22.

In an alternate embodiment of the present invention, an airfoil of the type previously described is made by alternating layers of a metallic foil 28 and a polymeric composite layer thereby forming a laminated composite airfoil. In this embodiment, the polymeric composite layer is utilized in the same manner as the previously described elastomeric layer 30. The metallic foil once again forms the first and last layer assembled into the die so that the outer surfaces of the airfoil are metal. Titanium alloy pins coated with an adhesive capable of bonding to the alloy and the laminated-composite are disposed in each dovetail root section aperture 22. Furthermore, the minimum cure temperature capability of the adhesive must be approximately the same as the cure temperature of the laminated composite. Finally, the adhesive must be chemically compatible with the laminated composite comprising the blade. Adhesives which may be used include AF191 or AF163-2 obtainable from 3-M Company, FM238 obtainable from American Cyanamid or PL777 obtainable from B. F. Goodrich. After application of the adhesive, the pins are assembled through the dovetail root apertures.

In a preferred embodiment, the polymeric composite layer is a fiber embedded in a flowable resin based matrix forming a lamina. Any polymeric composite layer having a high strength-to-weight ratio and having a resin capable of bonding to metal is acceptable. In a most preferred embodiment of the present invention, the reinforcement is a 12 K filament tow of an intermediate modulus carbon fiber having an individual fiber cross-sectional thickness of about 5 microns. The flowable resin based matrix is selected from the group consisting of epoxy, BMI, and polycyanate. Preferred are F3900 or 8551-7 which are toughened epoxies. Thin layers of uncured polymeric composite material having thicknesses of about 0.005–0.006 inches are commercially available and may be obtained from Hexcel Corp.

under the name of F3900/IM-7 or from Hercules Corp. under the name of 8551-7/IM-7. The preferred metallic foil is titanium alloy foil as previously described and the high strength metal members inserted into the dovetail root flank apertures are titanium alloy pins.

The method of forming a laminated airfoil using a polymeric composite layer rather than an elastomeric layer is similar to the method previously described. After accurately preshaping and trimming both the metallic foil and the uncured polymeric composite plies to a predetermined size, the metallic foils and polymeric composite plies are alternately assembled into a ply assembly in alternating layers with the metallic foil forming the first and last layers in the assembly so that the outer surfaces of the airfoil ply assembly are metal. This ply assembly is then inserted into the die cavity and compacted using sufficient heat and pressure to cause the polymeric composite matrix to flow, thereby simultaneously bonding the matrix o the polymeric composite to the metallic foil and curing the ply assembly into a finished or semi-finished airfoil. Optionally, a metal leading edge may be assembled to the ply assembly prior to insertion of the assembly into the die cavity. In this case, the cured airfoil will include a metal leading edge.

The cured airfoil is finished by drilling dovetail root aperture holes into the dovetail root flank surface and inserting adhesive-coated metal members through the apertures to provide additional strength. This operation is followed by final machining of the dovetail flank and by trimming operations, if necessary. A metal sheath 20, usually of the same material as the metallic foil used in the ply assembly, is applied to the leading edge 16 of the blade using an adhesive, if this item was not cured with the airfoil assembly in the die. A typical adhesive is AF-163-2 which is an epoxy-based adhesive obtainable from the 3-M Company.

In the preferred embodiment using titanium alloy metallic foil, such as Ti-6Al-4V, and an uncured polymeric composite ply, such as F3900/IM-7, the ply assembly is placed in the die cavity and heated to a temperature of about 325°-375° F. at a pressure of about 100-200 psi for about 2 hours at temperature.

Figures 3, 4:
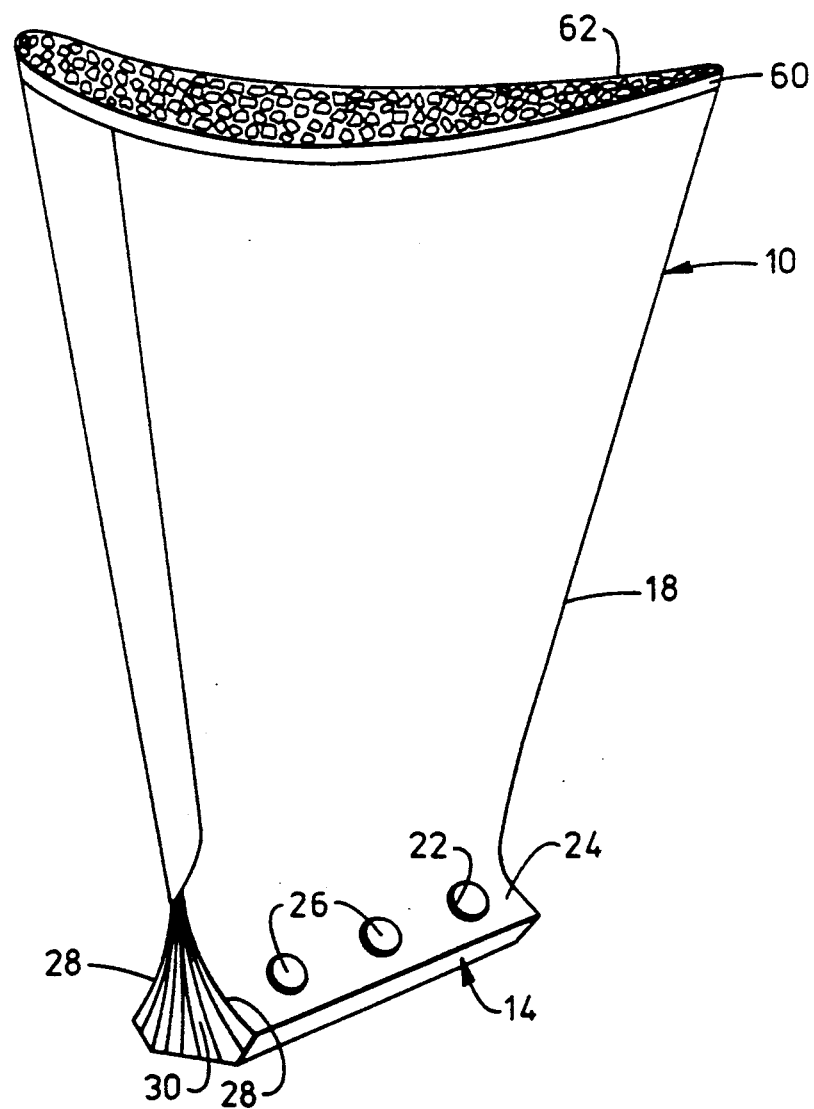
FIG. 3 is a partial cross-section of a laminated blade having alternating layers of metallic foil, elastomeric material and polymeric composite ply.
FIG. 4 is a perspective view of a fan blade airfoil having a dovetail root, a metal tip cap, a metal leading edge and an abrasive tip applied to the metal tip cap.

In still another embodiment of the present invention, as depicted in partial cross-section in FIG. 3, the laminated airfoil as previously described is made from alternating layers of metallic foil 28, polymeric composite ply 50 and an energy-absorbing elastomeric layer 30 to form a laminated composite airfoil assembly. In this embodiment, the elastomeric layer 30 is interposed between each layer of metallic foil 28 and polymeric composite ply 50 to join the metallic foil 28 to the polymeric composite ply 50. Once again, the metallic foil 28 forms the first and last layers of the ply assembly so that the outer surface of the airfoil is metal.

The polymeric composite ply 50 comprises an intermediate modulus carbon fiber in a resin-based matrix of the type previously discussed, such as a F3900/IM-7 or 8551-7/IM-7. The elastomeric layer in the preferred embodiment is a modified adhesive film such as FM-300I or an epoxy adhesive film having a thermoplastic carrier, such as HXT-440, or a bis-maleimide adhesive film with thermoplastic carrier such as HXT-441. The metallic foil is selected from the group consisting of titanium or titanium alloys, nickel base superalloys and stainless steels and may be produced by superplastic forming. However, the preferred metallic foil is titanium alloy foil, Ti-6Al-4V, produced by superplastic forming. The method of forming the laminated airfoil using polymeric composite ply, metallic foil and an elastomeric adhesive is similar to the previously described methods of forming airfoils. The metallic foil 28 and the polymeric composite plies 50 are preshaped and accurately trimmed to a predetermined size. The metallic foil 28 and the polymeric composite plies 50 are then alternately layered into a laminated assembly, with elastomeric adhesive interposed between each piece of metallic foil 28 and polymeric composite plies 50. The metallic foil forms the first and last layers of the assembly. The laminated assembly is then placed in a die cavity. Optionally, the metal sheath leading edge 20 may be assembled into the die with the laminated assembly in the manner previously discussed. The laminated assembly is then pressed in the die while applying sufficient heat and pressure to cause the elastomeric adhesive to flow thereby simultaneously bonding the polymeric composite matrix having embedded fibers to the metallic foil. The heat and pressure also cure the polymeric composite matrix. The cured airfoil is then removed from the die.

If necessary, the cured airfoil may be trimmed. Apertures 22 are drilled in the dovetail root flanks 14 and adhesive-coated titanium alloy pins are inserted into the apertures. A metal sheath, made from the same alloy as the metallic foil may be attached to the leading edge 16 of the airfoil using an epoxy adhesive, if the metal leading edge is not applied to the laminated airfoil assembly as part of the curing operation in the die.

In the preferred embodiment of this alternate assembly, the ply assembly is heated to a temperature of about 250°-350° F. and to a pressure of about 100-200 psi for about 2 hours. The laminated airfoil of the present invention is most useful as a wide chord fan blade in a turbine engine. The laminated airfoil of the present invention may also find use as a vane for the compressor section of a turbine engine.

Any of the composite airfoils of the present invention may be provided with an optional tip cap 60, as shown in FIG. 4. The tip cap 60 may be a standard formed cap made of titanium, titanium alloy or stainless steel. When a tip cap is provided, however, it is preferably of the same metal as that used in the blade assembly. Thus, in the preferred embodiment, the tip cap is superplastically formed Ti-6Al-4V. As is well-known in the turbine engine blade arts, any abrasive layer such as layer 62 in FIG. 4 may be applied to tip cap 60 to improve the abrasive wear characteristics of the blade as contact with the engine occurs during engine operation.

In light of the foregoing discussion, it will be apparent to those skilled in the art that the present invention is not limited to the embodiments, methods and compositions herein described. Numerous modifications, changes, substitutions and equivalents will now become apparent to those skilled in the art, all of which fall within the scope contemplated by the invention.

What is claimed is:

1. An energy absorbing, laminated airfoil having a tip portion, a dovetail root section, a leading edge extending from the tip portion to the root section, and a trailing edge oppositely disposed to the leading edge and extending from the tip portion to the root section, comprising:

alternating layers of a metallic foil and an elastomeric layer forming a laminated composite airfoil, the metallic foil forming the first and last layers,;

the dovetail root section having flank surfaces with at least one aperture extending from each flank surface through a portion of the dovetail root section;

a high strength metal member disposed through each dovetail root section aperture; and a metal sheath attached to the leading edge.

2. The laminated airfoil of claim 1 wherein the metallic foil is selected from the group consisting of titanium alloys, nickel base superalloys and stainless steels.

3. The laminated airfoil of claim 2 wherein the metallic foil is a titanium alloy foil produced by superplastic forming.

4. The laminated airfoil of claim 1 wherein the elastomeric layer is selected from the group consisting of an adhesive film having a thermoplastic carrier, a modified adhesive film and a polyurethane film coated with an adhesive layer.

5. The laminated airfoil of claim 4 wherein the film of the adhesive film having a thermoplastic carrier is selected from the group consisting of HXT-440, or HXT-441.

6. The laminated airfoil of claim 4 wherein the film of the modified adhesive film is FM-300I.

7. The laminated airfoil of claim 4 wherein the adhesive layer of the polyurethane film coated with an adhesive layer is AF163-2.

8. The laminated airfoil of claim 1 wherein the high strength metal members are titanium-alloy pins.

9. The laminated airfoil of claim 1 wherein the airfoil is a wide chord fan blade for a turbine engine.

10. The laminated airfoil of claim 1 wherein the airfoil is a vane for a turbine engine.

11. An energy absorbing, laminated airfoil having a tip portion, a dovetail root section, a leading edge extending from the tip portion to the root section, and a trailing edge oppositely disposed to the leading edge and extending from the tip portion to the root section, comprising:

alternating layers of a metallic foil and a polymeric composite layer forming a laminated composite airfoil, the metallic foil forming the first and last layers,;

the dovetail root section having flank surfaces with at least one aperture extending from each flank surface through a portion of the dovetail root section;

a high strength metal member disposed through each dovetail root section aperture; and a metal sheath attached to the leading edge.

12. The airfoil of claim 11 wherein the polymeric composite layer is a fiber embedded in a flowable resin-based matrix.

13. The laminated airfoil of claim 12 wherein the fiber of the polymeric composite layer is a carbon fiber and the matrix is selected from the group consisting of epoxy resin, Bis-maleimide resin and polycyanate resin.

14. The laminated airfoil of claim 13 wherein the polymeric composite layer is selected from the group consisting of F3900/IM-7 and 8551-7/IM-7.

15. The laminated airfoil of claim 11 wherein the metallic foil is selected from the group consisting of titanium alloy, nickel base superalloys and stainless steels.

16. The laminated airfoil of claim 11 wherein the metallic foil is a titanium alloy foil produced by superplastic forming.

17. The laminated airfoil of claim 11 wherein the high strength metal members are titanium alloy pins.

18. The laminated airfoil of claim 11 wherein the airfoil is a fan blade for a turbine engine.

19. The laminated airfoil of claim 11 wherein the airfoil is a vane for a turbine engine.

20. An energy absorbing, damped, laminated airfoil having a tip portion, a dovetail root section, a leading edge extending from the tip portion to the root section, and a trailing edge oppositely disposed to the leading edge and extending from the tip portion to the root section, comprising:

alternating layers of a metallic foil, a polymeric composite layer, and an elastomeric layer, forming a laminated composite airfoil, the metallic foil forming the first and last layers, and the elastomeric layer interposed between each piece of metallic foil and polymeric composite layer;

the dovetail root section having flank surfaces with at least one aperture extending from each flank surface through a portion of the dovetail root section;

a high strength metal member disposed through each dovetail root section aperture; and a metal sheath attached to the leading edge.

21. The airfoil of claim 20 wherein the polymeric composite layer is a fiber embedded in a resin-based matrix.

22. The laminated airfoil of claim 21 wherein the fiber of the polymeric composite layer is a carbon fiber and the matrix is selected from the group consisting of epoxy resin, Bis-maleimide resin and polycyanate resin.

23. The laminated airfoil of claim 20 wherein the metallic foil is selected from the group consisting of titanium alloy metals, nickel base superalloys and stainless steels.

24. The laminated airfoil of claim 20 wherein the metallic foil is a titanium alloy foil produced by superplastic forming.

25. The laminated airfoil of claim 20 wherein the high strength metal members are titanium alloy pins.

26. The laminated airfoil of claim 20 wherein the elastomeric layer is a modified adhesive film.

27. The laminated airfoil of claim 26 wherein the modified adhesive film is FM-300I.

28. The laminated airfoil of claim 20 wherein the elastomeric layer is an adhesive film having a thermoplastic carrier.

29. The laminated airfoil of claim 28 wherein the adhesive film having a thermoplastic carrier is selected from the group consisting of HXT-440 and HXT-441.

30. The laminated airfoil of claim 20 wherein the airfoil is a fan blade for a turbine engine.

31. The laminated airfoil of claim 20 wherein the airfoil is a vane for a turbine engine.

* * * * *